C. F. BOWES.
HOSE RACK.
APPLICATION FILED FEB. 8, 1905.
903,538.
Patented Nov. 10, 1908.
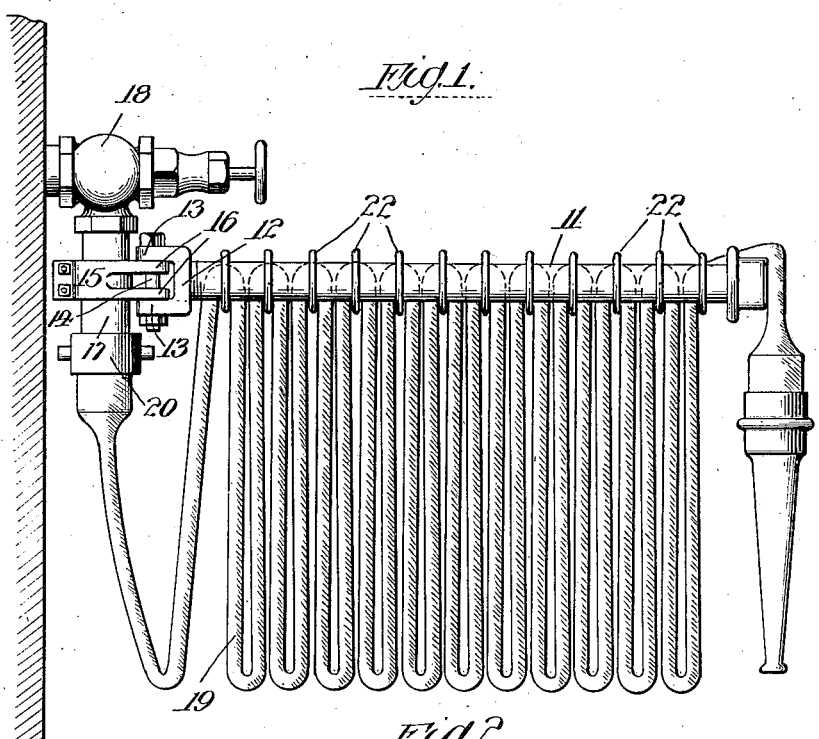
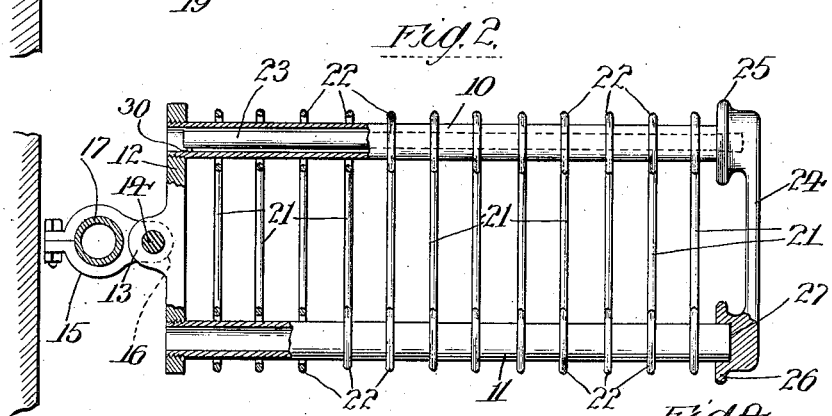
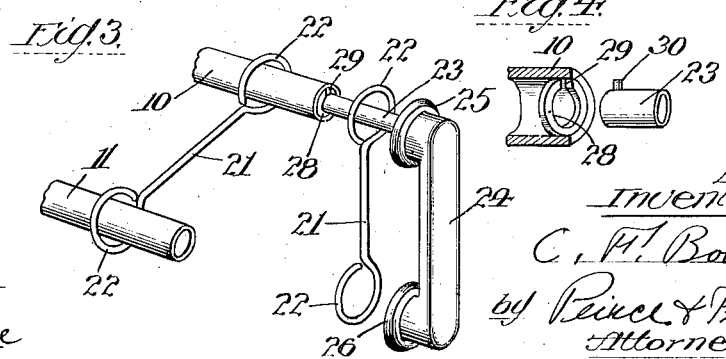
Witnesses:
Luto J. Alter
Lillian Prentice
Inventor:
C. F. Bowes
by Peirce & Fisher
Attorneys.

UNITED STATES PATENT OFFICE.

CHARLES FRANKLIN BOWES, OF CHICAGO, ILLINOIS, ASSIGNOR TO W. D. ALLEN MANUFACTURING COMPANY, OF CHICAGO, ILLINOIS, A CORPORATION.

HOSE-RACK.

No. 903,538.  Specification of Letters Patent.  Patented Nov. 10, 1908.

Application filed February 8, 1905. Serial No. 244,748.

*To all whom it may concern:*

Be it known that I, CHARLES FRANKLIN BOWES, a citizen of the United States, and a resident of Chicago, county of Cook, and State of Illinois, have invented certain new and useful Improvements in Hose-Racks, of which the following is declared to be a full, clear, and exact description.

The invention relates to hose racks or holders adapted to support hose for fire protective purposes.

In particular the invention relates to that type of hose rack in which the hose is supported in a series of depending loops by cross-supports or pins which slide outwardly to release the successive loops of the hose as the latter is drawn from the rack.

The object of the invention is to provide a simple and effective construction in which the hose-carrying cross pins are securely held against displacement upon the rack, but are free to slide thereon as the hose is pulled from the rack.

A further object of the invention is to provide a hose rack in which the pins are detached from the rack at one end only to release the successive loops of hose so that they will not drop from the rack when the hose is removed.

With these and other objects in view, the invention consists in the features of construction, combinations and arrangements of parts hereinafter set forth, illustrated in the accompanying drawings and more particularly pointed out in the appended claims.

In the drawings Figure 1 is a side elevation of the improved hose rack. Fig. 2 is a plan view thereof with certain parts shown in section. Fig. 3 is a detail perspective view of the outer end of the rack. Fig. 4 is a detail perspective view of certain portions of the rack.

The main body of the hose rack comprises a pair of side supports or bars 10 and 11 which are preferably cylindrical and tubular, as shown, and may be conveniently formed of pieces of piping. At their inner ends the side bars or arms 10 are threaded into or otherwise suitably secured to a bracket 12. If desired, the bracket 12 and side bars 10 and 11 may be cast in one piece.

The bracket 12 is preferably provided with ears 13, through which extends a bolt 14 for pivotally connecting the rack to a support 15. The support 15 is provided with lugs 16 which extend between the lugs 13 on the bracket and engage the pivot bolt 14. In the construction shown, the support 15 is in the form of a clamp ring adapted to engage and support the rack upon the supply pipe 17. Supply pipe 17 is provided with the usual controlling valve 18 and the hose 19 is connected to the supply pipe by the coupling 20.

If desired, the support 15 may be in the form of a flat plate for securing the hose rack to the wall.

The cross supports or pins 21 for carrying the depending loops of hose are connected at their ends to the side supports or bars 10 and 11 of the rack so as to be held against displacement but free to slide lengthwise thereon. These cross supports or pins are preferably formed of metal rods or heavy wire and are preferably provided at their ends with loops or eyes 22 extending about or encircling the supporting bars 10 and 11. Loops or eyes 22 loosely fit the supporting bars 10 and 11 so that the cross supports or pins 21 are free to slide lengthwise of the rack and thus release the successive loops of hose at the outer end of the rack as the hose is pulled therefrom when occasion arises for its use. While supports or pins 21 are free to slide outwardly to release the loops of hose, they are so connected to the supporting bars 10 and 11 by the eyes 22, that they cannot be twisted into an inclined position relatively to the length of the rack and thus displaced therefrom as is the case with racks in which the ends of the pins loosely engage guide grooves. By reason of this arrangement, the hose may be readily and quickly placed in position upon the rack, is securely held thereon, but is free to be removed quickly in case it is needed.

Suitable means are provided for engaging and retaining the cross-supports or pins as the hose is removed from the rack, so that, while the successive loops of hose are released the pins will not drop from the rack. Such retaining means preferably comprises an extension support 23 carried by the side bar 10, and with which the loops or eyes 22 at one end of the pins engage as the hose is removed from the rack, while the eyes or loops 22 at the other end of the pins are free to slide over or be detached from the outer free end of the side bar 11, so as to release the successive loops of hose.

It will be seen that the rack has two supporting arms which carry the cross supports 21 for the folds of hose, and that one of the arms consists of a supporting rail 10 and a collecting and retaining rail 23, which rails are connected at the outer end of the supporting rail in such a manner as to permit the fold supports 21 to pass freely from the supporting rail to the collecting and retaining rail as the hose is removed from the rack.

The extension support 23 is preferably movably or slidably connected to the side bar 10 and in the form shown, comprises a round rod telescoped within the hollow or tubular bar 10. The support 23 fits loosely within the bar 10 so as to be free to slide therein, and an end or cross piece 24 is secured to the outer end of the support, as shown. The end or cross piece 24 is provided at its ends with enlarged portions or abutments 25 and 26. In normal position the head 25 is adapted to abut against the end of the side support 10, while the head 26 at the opposite end of the cross piece is provided with a depression or socket 27 within which the side support or bar 11 extends so that the end or cross piece 24 is detachably connected to the support or bar 11. Bar 11 is somewhat longer than the side bar 10 so that it may extend within the socket 27, and so that the inner faces of the heads or abutments 25 and 26 may be in line and parallel with the cross supports or pins 21, and at right angles to the side bars 10 and 11.

The heads 25 and 26 upon the ends of cross piece 24, are of sufficient size to be suitably engaged by the eyes 22 upon the ends of the hose-carrying pins 21, so as to shift the extension support 23 outwardly into position to engage and uphold the pins as the hose is removed from the rack.

In use, the hose will be suspended in a series of depending loops from the hose-carrying cross supports or pins 21, and the end piece 24 will be placed in position with the abutment 25 thereon against the side bar 10 and with its opposite end slipped over the outer end of the side bar 11, as indicated in Figs. 1 and 2. As the hose is pulled from the rack, the cross piece will slide outwardly and strike against the abutments 25 and 26 upon the end piece 24, so as to release the latter from the side bar 11 and shift it, together with the extension support 23 outwardly. As soon as the cross piece 24 is disengaged from the side bar 11, it will swing down into vertical position, as shown in Fig. 3. The eyes 22 at one end of the cross supports or pins 21 will pass onto the support 23 as the hose is pulled from the rack so as to be collected and retained thereby, but the pins will slide over or be detached from the side bar 11 at their opposite ends and swing down into vertical position as indicated in Fig. 3, to release the successive loops of hose. In this manner, the hose may be quickly withdrawn from the rack when it is desired for use, but the pins are released at one end only and are permanently connected to the rack at their opposite ends, so that the hose may be conveniently restored to position upon the rack.

To prevent the extension support 23 from being entirely disconnected from the rack, a washer or collar 28, having a notched or cut-away portion as at 29, is fitted within the outer end of the side bar 10, as most clearly indicated in Figs. 3 and 4. The inner end of the supporting rod 23 is provided with a laterally extending lug or pin 30, which passes through the notch 29. When the supporting-rod 23 is placed within the side bar 10, pin 30 and notch 29 are so located that, when the end piece 24 is in the position shown in Fig. 3, the pin 30 will be out of line with the notch and the supporting rod 23 cannot be completely withdrawn from the side bar 10.

It is obvious that numerous changes may be made in the details of structure without departure from the essentials of the invention.

Having described my invention what I claim as new and desire to secure by Letters Patent is:—

1. In a hose rack, the combination of a pair of rigid side arms permanently connected together only at their inner ends, and a series of separate cross pins having their end portions bent to form loops loosely fitting about said side arms, said loops serving to hold said cross pins against accidental displacement while said pins are freely slidable upon said side arms and over the outer end of at least one of them.

2. The combination with a hose-rack, of a series of hose-carrying cross-supports in horizontal alinement and arranged to slide outwardly in the direction of the length of the rack and to be disconnected therefrom at one end only in the act of removing the hose, substantially as described.

3. In a hose-rack, the combination of a pair of side-supports, a series of hose-carrying cross-supports slidably and permanently connected to one of said side-supports and slidably mounted on the other of said supports but detachable from the free outer end thereof, substantially as described.

4. In a hose-rack, the combination of a pair of side-supports, and hose-carrying pins slidably mounted upon said side supports and detachable from the outer end of one of said supports, the other of said side-supports having an extension for holding the pins as the hose is removed from the rack, substantially as described.

5. In a hose-rack, the combination of a pair of side supports, hose-carrying cross-supports slidably mounted on said side supports and means at the outer end of the rack for engaging one end of said cross-supports and supporting the same as the hose is removed from the rack, substantially as described.

6. In a hose-rack, the combination of a pair of side supports, an extension support slidably connected to one of said side supports and a series of hose-carrying cross-supports mounted on said side supports and slidable therefrom onto said extension support, substantially as described.

7. In a hose-rack, the combination of a pair of side supports, an extension support slidably connected to one of said side supports, a series of hose-carrying pins mounted on said side supports and slidable therefrom onto said extension support and an abutment connected to said extension support with which the pins engage to shift the same, substantially as described.

8. In a hose-rack, the combination of a pair of supporting-bars, an extension support slidably connected to one of said bars, and an end-piece connected to said support and detachably engaging the other of said bars and hose-carrying cross-pins mounted on said supporting bars and slidable therefrom onto said extension support, substantially as described.

9. In a hose-rack, the combination of a pair of side supports, hose-carrying pins having loops at their ends extending about said supports and slidable outwardly thereon to release the hose and means at the outer end of the rack for engaging the loops at one end of said pins as the hose is removed from the rack, substantially as described.

10. In a hose-rack, the combination of a pair of supporting bars and a series of hose-carrying cross-pins having end loops extending about said bars, said pins being slidable outwardly over the free outer end of one of said bars to release the hose, the other of said bars having an extension for engaging the loops at one end of the pins to uphold the same as the hose is removed from the rack, substantially as described.

11. In a hose-rack, the combination of a pair of supporting bars and a series of hose-carrying cross-pins having end loops extending about said bars, said pins being slidable outwardly over the free outer end of one of said bars to release the hose and an extension support slidable longitudinally upon the other of said bars with which the loops at one end of the pins engage as the hose is removed from the rack, substantially as described.

12. In a hose-rack, the combination of a pair of supporting bars, an extension support slidable within one of said bars, an end-piece connected to said support and detachably engaging the other of said side bars, and a series of hose-carrying cross-pins having end loops engaging said side bars, and slidable outwardly therefrom onto said extension support, substantially as described.

13. In a swinging hose-rack, the combination of side bars, hose-carrying cross-pins having end loops engaging said side bars and slidable outwardly thereon to release the hose, an extension support slidably telescoped within one of said side bars and an end-piece connected to said extension support and having a socket-head detachably engaging the other of said side bars, substantially as and for the purposes described.

14. A hose rack comprising supporting members, and hose carrying elements bodily movable longitudinally of said members and automatically detachable from one of them and retained by the other.

15. A hose rack comprising supporting members, and longitudinally movable hose carrying elements held against disconnection from one of the members, and automatically detachable from the other.

16. A hose rack comprising supporting members, and hose carrying elements movable longitudinally of the members and automatically detachable from one of them to release the hose and non-detachable from the other.

17. A hose rack comprising a pair of supporting members, and hose carrying elements slidable on both members, automatically detachable from one of them, and having a swinging connection with the other.

18. A hose rack having fold supports upon which the hose is hung in folds and a supporting arm constructed with a supporting rail and a collecting and retaining rail for the fold supports.

19. A hose rack having fold supports upon which the hose is hung in folds and a supporting arm constructed with a supporting rail and a collecting and retaining rail for the fold supports, said rails being connected at the outer end of the supporting rail so that the fold supports pass freely from one to the other.

20. A hose rack having transverse fold supports, a supporting arm upon which said fold supports are releasably supported, and a supporting arm upon which the hose supports are irreleasably supported constructed with a supporting rail and a collecting and retaining rail.

21. A hose rack having transverse fold supports, a supporting arm upon which said fold supports are releasably supported, and a supporting arm upon which the hose supports are irreleasably supported constructed with a supporting rail and a collecting and retaining rail; said fold supports releasing their engagement with the arm first named as they pass from the supporting to the collecting and retaining rail of the other arm.

22. In a hose rack, the combination of a pair of side-supports, a series of hose-carrying cross-supports slidably mounted on said side supports and having their ends extending about said side supports to hold said cross-supports against accidental displacement, and means connected to the outer end of the rack whereon the cross-supports are assembled and retained as the loops of hose are freed therefrom.

23. In a hose rack, the combination of a pair of side arms, a series of hose-carrying cross-supports having end portions extending about said side arms, said cross-supports being slidable over the outer ends of said arms to release the hose, and a retainer device connected to the outer end of one of said arms for collecting the cross-supports as the loops of hose are freed therefrom.

24. A hose rack comprising a pair of side-supports, hose-supporting members slidably mounted on said side-supports and arranged to be disengaged from one of said side-supports in the act of removing the hose, and a retainer device connected to the outer end of the other side-support whereon said hose-supporting members are collected as the hose is freed therefrom.

25. A hose rack having a series of hose-carrying cross-supports arranged to slide outwardly in the direction of the length of the rack and to be disengaged therefrom at one end in the act of removing the hose, and means connected to the outer end of the rack whereon said cross-supports are collected and retained as the hose is freed therefrom.

CHARLES FRANKLIN BOWES.

Witnesses:
KATHARINE GERLACH,
LILLIAN PRENTICE.